United States Patent [19]
DeGuchi

[11] Patent Number: 5,199,675
[45] Date of Patent: Apr. 6, 1993

[54] NUT, AND A DEVICE USING THE NUT FOR CLAMPING AND SUPPORTING ELONGATE OBJECTS

[75] Inventor: Takeshi DeGuchi, Osaka, Japan

[73] Assignee: Inaba Denki Sangyo Co., Ltd., Osaka, Japan

[21] Appl. No.: 581,583

[22] Filed: Sep. 12, 1990

[30] Foreign Application Priority Data

Dec. 28, 1989 [JP] Japan .................. 1-152762[U]
Mar. 12, 1990 [JP] Japan .................. 2-25448[U]

[51] Int. Cl.$^5$ ............................................ F16L 3/22
[52] U.S. Cl. ................................ 248/62; 248/68.1; 248/59; 411/433
[58] Field of Search ............ 248/62, 68.1, 70, 59; 411/433, 435, 908

[56] References Cited

U.S. PATENT DOCUMENTS

| | | | |
|---|---|---|---|
| 429,357 | 6/1890 | McBee | 248/68.1 |
| 3,556,447 | 1/1971 | Jenkins | 248/68.1 X |
| 4,531,872 | 7/1985 | Warkotsh | 411/433 |
| 4,541,602 | 9/1985 | Potzas | 248/68.1 X |
| 4,657,458 | 4/1987 | Woller et al. | 411/433 X |
| 4,905,942 | 3/1990 | Moretti | 248/68.1 |

FOREIGN PATENT DOCUMENTS

| | | | |
|---|---|---|---|
| 898794 | 4/1972 | Canada | 411/433 |
| 59207 | 12/1967 | Fed. Rep. of Germany | 411/433 |
| 1011474 | 1/1965 | United Kingdom . | |
| 1413804 | 12/1975 | United Kingdom . | |
| 1455549 | 10/1976 | United Kingdom . | |

Primary Examiner—Alvin C. Chin-Shue
Attorney, Agent, or Firm—Webb, Burden, Ziesenheim & Webb

[57] ABSTRACT

The present invention relates to a nut circumferentially split into two parts, a supporting device for supporting elongate objects, the supporting device including the nut and holders for receiving the elongate objects, the nut being fixable to a selected position longitudinally of a rod-like supporting member extending vertically, and a clamping device for elongate objects, the clamping device including engaging portions through which holders are connected to the nut.

The nut according to the present invention includes a pivotal connection for interconnecting circumferential ends of the nut parts to be pivotable between an open position and a closed position, and a retainer for releasably holding the nut parts in the closed position.

The present invention further provides a supporting device for supporting elongate objects, which is effective to avoid falling of the elongate objects; a clamping device for elongate objects, which has wide application and is capable of being attached also to other positions than a screw portion of an anchor bolt or the like; and a device for allowing a reliable temporary tightening or fitup when screwing together various components of the supporting device.

19 Claims, 13 Drawing Sheets

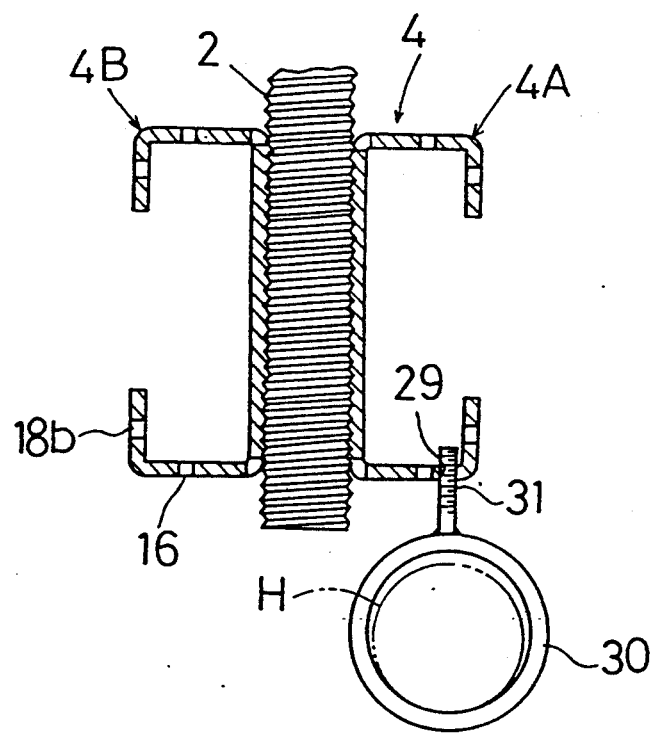
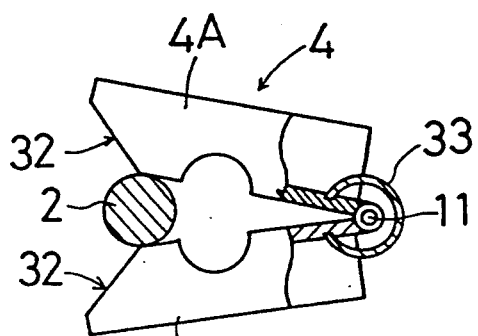
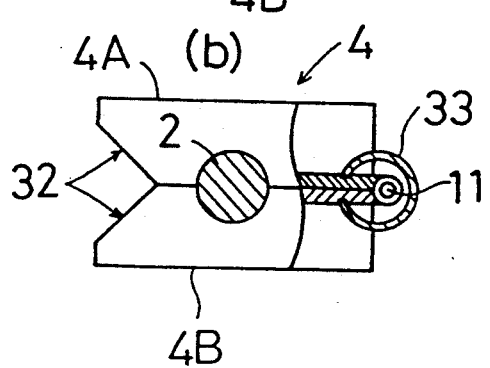
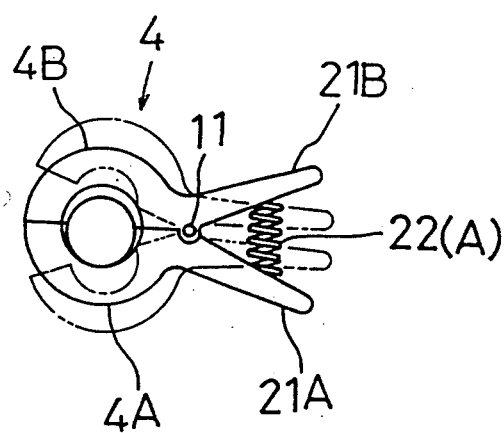

NUT, AND A DEVICE USING THE NUT FOR CLAMPING AND SUPPORTING ELONGATE OBJECTS

BACKGROUND OF THE INVENTION

1. Field of the Invention

The present invention relates to a nut circumferentially split into two parts, a supporting device for supporting elongate objects, the supporting device including the nut and holders for receiving the elongate objects, the nut being fixable to a selected position longitudinally of a rod-like supporting member extending vertically, and a clamping device for elongate objects, the clamping device including engaging portions through which holders are connected to the nut.

2. Description of the Prior Art

As shown in FIG. 23, for example, a known split nut is secured to an anchor bolt 2 by connecting screw 25 interconnecting a pair of nut parts 4A and 4B at opposite circumferential ends thereof. As distinct from an ordinary hexagon nut, this type of split nut can be directly screwed to a selected position of the anchor bolt 2 without turning and moving the nut to that position. Such a split nut can readily be mounted on a bolt having closed opposite ends also. However, the illustrated known nut requires an irksome operation for connecting the two split nut parts 4A and 4B by the connecting screw 25 together opposite circumferential ends thereof.

FIG. 24 shows an example of known supporting devices for supporting elongate objects as noted above. This supporting device comprises a channel member 05 including a dovetail groove 24, which can be fixed in a horizontal posture, by using two nuts 23, to an anchor bolt 2 acting as a rod-like supporting member depending from a ceiling. This channel member 05 has a bottom wall acting as a mounting portion, and a top surface acting as a supporting portion for supporting an elongate object H such as a pipe. The elongate object H is fixed by a retainer 6 engaging the dovetail groove 24 of the channel member 05. With such a supporting device, however, the elongate object placed on the channel member during a mounting operation could inadvertently roll off the channel member before the elongate object is securely held by the retainer. Thus, sufficient care must be taken such as by holding the elongate object by the hands.

SUMMARY OF THE INVENTION

A first object of the present invention is to provide a nut which does not involve an irksome mounting operation.

A second object of the present invention is to provide a supporting device for supporting elongate objects, which is effective to avoid falling of the elongate objects during a mounting operation or the like.

A third object of the invention is to provide a clamping device for elongate objects, which has wide application and is capable of being attached also to other positions than a screw portion of an anchor bolt or the like.

A fourth object of the present invention is to provide an improvement for allowing a reliable temporary fixation or fitup, without screws readily loosening, when screwing together various components of a supporting device for supporting elongate objects.

In order to fulfill the first object noted above, a nut according to the first aspect of the invention comprises a pair of nut parts formed by circumferentially dividing the nut, a pivotal connection for interconnecting circumferential ends of the nut parts to be pivotable between an open position and a closed position, and retainer means for releasably holding the nut parts in the closed position.

For attaching the nut to a bolt, according to the first aspect of the invention, the nut parts are swung to the open position to open its threaded bore and the opened bore is placed on the bolt. Then the nut parts are swung to the closed position to close the threaded bore, and thereafter the retainer means is used to maintain the nut parts in the closed position. For removing the nut from the bolt, the retainer means is released and then the nut parts are swung to the open position to open the threaded bore. Since the two nut parts are interconnected at circumferential ends thereof to be pivotable between the open and closed positions, the retainer means may, for example, comprise a construction for bolting together the circumferential ends of the nut parts remote from the pivotal connection. Such a construction requires a simpler operation than the prior construction described hereinbefore. Thus, the present invention allows the nut to be attached to a bolt or detached therefrom with a simple operation.

In order to fulfill the second object noted above, a supporting device for supporting elongate objects according to a second aspect of the invention comprises, beside the nut according to the first aspect of the invention, holders each connected to the nut and formed into a recessed shape for receiving an elongate object, and covers for cleaning the holders, respectively, to prevent the elongate objects from moving out of the holders.

According to the second aspect of the invention, when the cover is opened, the elongate objects are retained in the recessed holders and have no possibility of rolling out of and falling from the holders. When the cover is closed, the elongate objects are prevented from being lifted and removed from the holders even if great vibrations are applied thereto. Thus, this construction saves the trouble of pressing the elongate object with hands, thereby expediting the mounting operation.

In order to fulfill the third object noted above, a clamping device for clamping elongate objects according to the third aspect of the invention comprises, besides the nut according to the first aspect of the invention, engaging sections for connecting elongate object supporting devices to a plurality of positions vertically of each of the nut parts, and a mounting section for attaching the nut parts in the open position to another object.

According to the third aspect of the invention, the clamping device may be attached to a bolt with ease as in the first aspect of the invention. After the clamping device is attached to the bolt, the elongate object supporting devices may be connected to a plurality of upper and lower positions since engaging sections are provided for connecting the supporting devices to a plurality of positions vertically of each of the nut parts. Upper and lower engaging section may be used jointly for connecting a larger supporting device than above-mentioned supporting devices. Consequently, one clamping device may be used for connecting different size supporting devices. The clamping devices may be secured to another object such as a corner of a wall. In this case, the clamping device is placed with the nut parts swung open on the corner, and the mounting section is used to fix the clamping device to the corner. Since this construction includes the mounting section for securing the clamping device with the nut parts opened, the clamping device may be attached to such a wall corner or other having a large diameter. The supporting device may be connected in a stepped relationship to each other to the respective nut parts, whereby elongate objects are supported as crossing each other without mutual interference. In this way, one clamping device may be used to carry elongate objects extending in different directions, which provides for a wide range of application of the clamping device.

In order to fulfill the fourth object noted above, a supporting device according to a fourth aspect of the invention, which is similar to the supporting device in the second aspect of the invention, comprises a screw acting as a fixing element, a screw retainer having a retaining bore of smaller diameter than an outer diameter of the screw, at least a portion of the screw retainer surrounding the retaining bore being formed of a material softer than the screw, and a recess formed in the free end of the cover for accommodating the screw retainer, the recess having a bottom defining a bore penetrable by the screw, wherein the screw penetrating the bore is temporarily fixable and rotatable relative thereto by turning the screw into the retaining bore.

According to the fourth aspect of the invention, since the retaining bore for receiving the screw has an inside diameter smaller than the outer diameter of the screw, the retaining bore of the elastic screw retainer, which is formed of an elastic material, for example, is expanded by elastic deformation when the screw is inserted into the retaining bore. The screw is thus rigidly held in the retaining bore by virtue of the elastic restoring force of the retainer. Where the screw retainer is formed of a material softer than the screw, the screw screwed into the retaining bore will cut threads in the bore by plastic deformation, whereby the screw is held tight. The screw is temporarily fixed to the cover in a reliable way since the screw retainer for rigidly holding the screw is compactly fitted in the recess of the cover or held therein by engaging means.

The screw is temporarily fixed to the cover not by direct meshing therewith but by the indirect retention through the screw retainer. Moreover, the screw retainer mounted in the recess of the cover may have a sufficient thickness compared with the thickness of the cover. Therefore, even if a structural limitation requires an end of the screw to be substantially flush with cover surfaces, the screw may be secured with a sufficient engaging length for the purpose of its temporary fixation.

It is unnecessary to form a threaded bore in the screw retainer in advance, much less in the cover, since the screw is forced into the retaining bore defined in the screw retainer and having a smaller diameter than the outer diameter of the screw. Consequently, the temporary screw fixing construction according to the present invention allows the screw to be rigidly retained by the screw retainer with a great engaging length secured for the screw. In this way, the screw is temporarily fixed to the cover in a reliable way, with hardly any chance of the screw falling off the cover during an operation. Thus, the present invention promotes efficiency of the operation, and reduces dangers of the operation such as chances of screws falling and injuring objects or persons.

Other objects, features and advantages of the present invention will be apparent from the following description of the preferred embodiments.

BRIEF DESCRIPTION OF THE DRAWINGS

FIGS. 1 through 3 show a nut, and a clamping device and a supporting device for elongate objects in a first embodiment of the present invention, in which:

FIG. 1 is a perspective view of the supporting device as mounted in position,

FIG. 2 is an exploded perspective view of the supporting device, and

FIG. 3 is a sectional view of the supporting device as mounted in position.

FIGS. 4 through 13 show modifications of the first embodiment, in which:

FIG. 4 is a fragmentary side in vertical section of a supporting device,

FIG. 5 is a perspective view of a supporting device as mounted in position,

FIG. 6 is an exploded perspective view of the supporting device shown in FIG. 5, FIG. 7 is a sectional view of the supporting device shown in FIG. 5, FIG. 8 is a sectional view of a supporting device as mounted in position, FIGS. 9 (a) and (b) are plan views, partly broken away, of a supporting device, FIG. 10 is a plan view of a supporting device, FIG. 11 is a sectional side view of a supporting device, FIG. 12 is a sectional side view of another supporting device, and FIG. 13 is an exploded perspective view of still another supporting device.

FIGS. 14 through 18 show a second embodiment of the invention, in which:

FIG. 14 is a perspective view of a clamping and supporting device as mounted in position, FIG. 15 is an exploded perspective view of the device, FIG. 16 is a sectional side of the device as mounted in position, FIG. 17 is a sectional view of the device as mounted in position, and FIG. 18 is a sectional view of a modification made to the second embodiment.

FIGS. 19 through 22 show a third embodiment of the invention, in which:

FIG. 19 is a sectional view of a pipe supporting device as mounted in position,

FIG. 20 is an exploded perspective view of the pipe supporting device,

FIG. 21 is a perspective view of the pipe supporting device as mounted in position, and FIG. 22 is a sectional view of a modification made to the second embodiment.

DESCRIPTION OF THE PREFERRED EMBODIMENTS

A first embodiment of the present invention will be described hereinafter with reference to the drawings.

Figure 1:
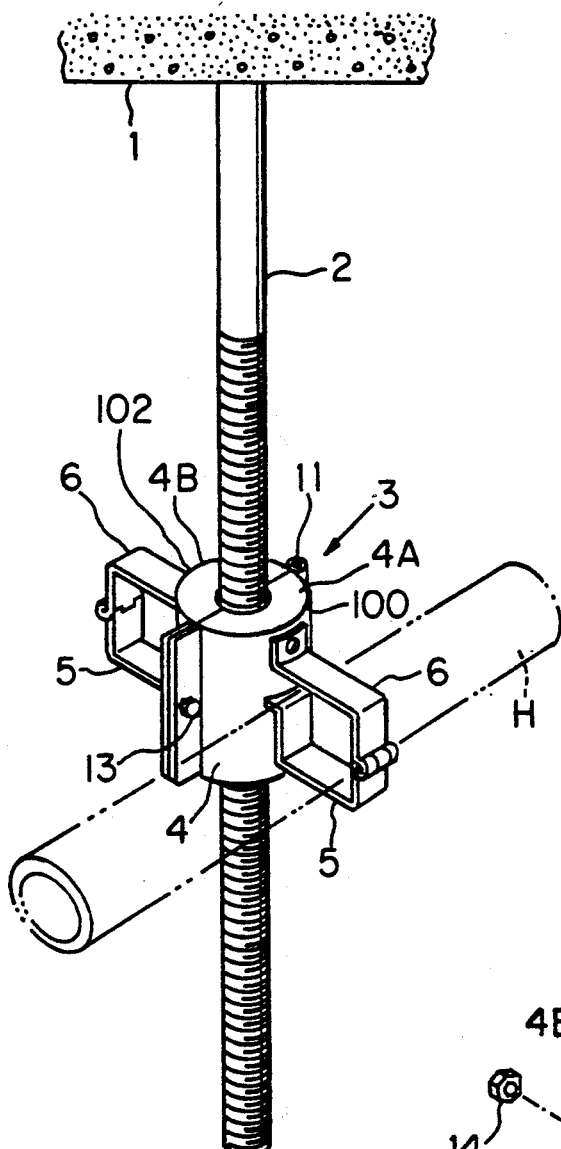

As shown in FIG. 1, an anchor bolt 2 (an example of rod-like supporting members) is suspended from a ceiling 1. A supporting device 3 is secured to the anchor bolt 2 for supporting elongate objects such as pipes H in a horizontal posture. The supporting device 4 includes a nut 4 engageable with the anchor bolt 2, a pair of holders 5 for receiving end portions of the pipes H, and covers 6 for retaining the pipes H in the holders 5.

Figure 2:
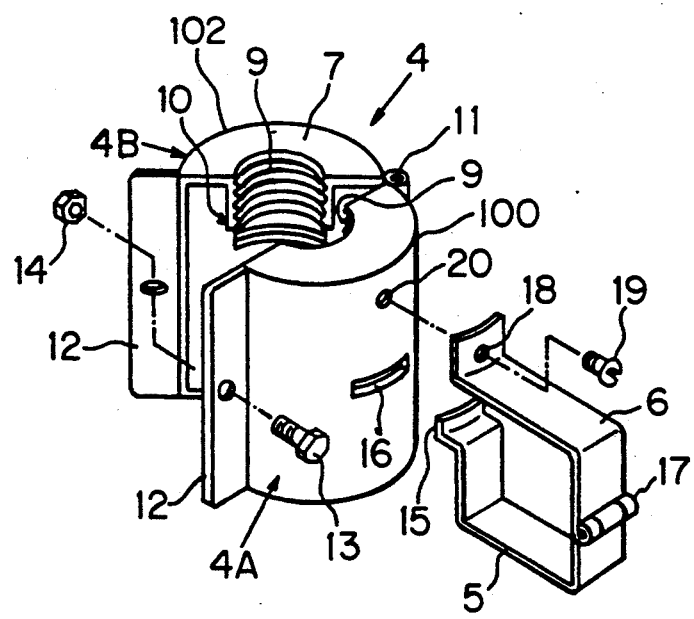
Figure 3:
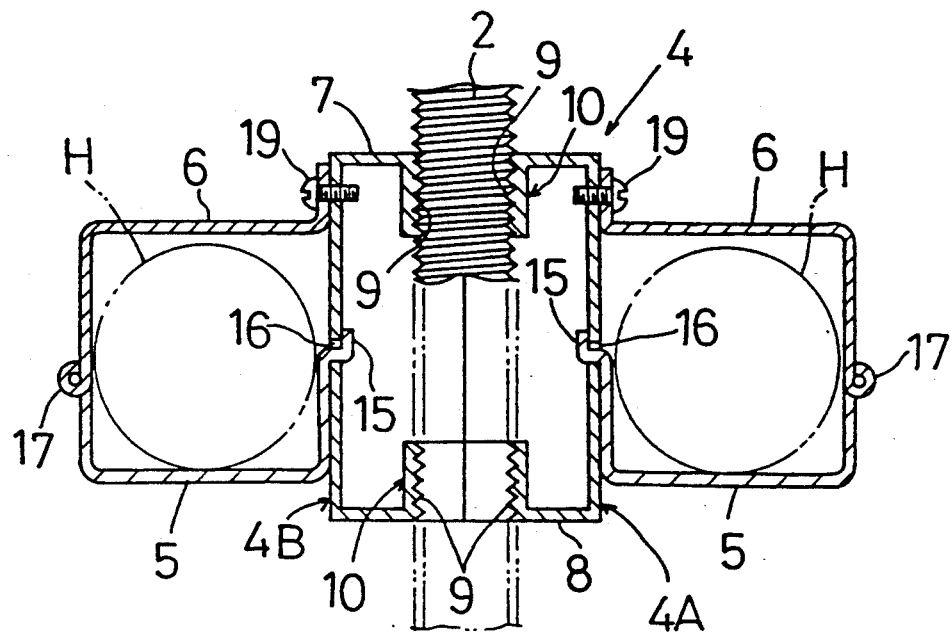

As shown in FIGS. 2 and 3, the nut 4 has a cylindrical shape with an overall length greater than an outer diameter including top and bottom walls 7 and 8. The top and bottom walls 7 and 8 include tubular female screws 10 defining threads 9, respectively. The nut 4, including the female screws 10, is circumferentially split into two parts 4A and 4B. The split nut parts 4A and 4B are pivotally interconnected at one circumferential end as at 11, on which the nut parts 4A and 4B are swingable between an open position and a closed position. Flanges 12 are formed at the other circumferential end of the nut parts 4A and 4B. The two nut parts 4A and 4B are reliably and readily maintained in the closed position by connecting the flanges 12 with a small screw 13. This construction has the advantage of securing a space for the connection particularly where the anchor bolt 2 is thin and the nut 4 small.

For attaching the nut 4 to the anchor bolt 2, the split nut parts 4A and 4B are opened and placed on a selected position of the anchor bolt 2. Then the nut parts 4A and 4B are closed to bring the two flanges 12 together while fitting the anchor bolt 2 and female screws 10 into thread-to-thread engagement. Thereafter the flanges 12 are tightened with the small screw 13 and a small nut 14 to maintain the split nut parts 4A and 4B in the closed position. Accordingly, nut parts 4A and 4B form at respective side walls 100 and 102 a slit 16 or bore 20, i.e., connected portions, to which at least one of the holders 5 or covers 6 are connected.

Each of the holders 5 is formed by bending a band plate into a channel shape for receiving the pipe H. The pipe H snugly fitted into the channel is prevented from rolling out of the holder 5. Each holder 5 has a proximal end defining a hook 15 for insertion into an engaging slit 16 defined in a peripheral position of the nut part 4A or 4B. Thus, each holder 5 is supported in a cantilever fashion by the nut 4. The holders 5 do not easily disengage from the nut 4 even if a force is applied to the holders 5 from below during a mounting operation since the hooks 15 contact inside walls of the split nut parts 4A and 4B.

Each cover 6 is pivotably connected to a distal end of each holder 5 through a hinge 17. The cover 6 is pivotable outwardly to open the holder 5 and inwardly to close the holder 5. The cover 6 has a free end defining a small bore 18 for receiving a small screw 19 (which is one example of fixing elements). The small screw 19 is tightened to a threaded bore 20 defined in a peripheral position of the split nut part 4A or 4B to fix the cover 6 in a closed position.

For causing each pipe H to be supported by the supporting device 3, the small screw 19 is removed from the small bore 18 and threaded bore 20, and the cover 6 is swung outwardly to open the holder 5. Then an end of the pipe H is placed in the holder 5 and the cover 6 is swung inwardly to close the holder 5. Finally, the small screw 19 is inserted into the bores 18 and 20 and turned tight. Since the cover 6 is pivoted to the holder 5, it is unnecessary to hold the cover 6 with a hand or to keep the cover 6 at a different location while the holder 5 is kept open, which facilitates handling. The holder 5 and cover 6 may readily be removed from the nut 4 by disengaging the hook 15 after disconnecting the cover 6 from the nut 4. Plural types of holders may be made available to suit various sizes of the elongate objects. This will allow the holders to be changed for supporting specific size elongate objects.

Figure 4:
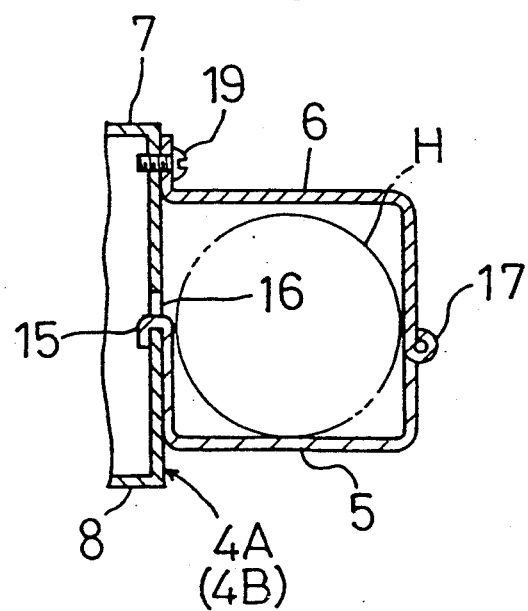

The first embodiment described above may be modified in many ways as follows:

In the first embodiment, the hook 15 of each cover 6 is turned upwardly. As shown in FIG. 4, the hook 15 may be turned downwardly and inserted into a somewhat wide engaging slit 16.

Each holder 5 may be removably attached to the nut 4 by means of a small screw or the like. However, the hook type connection as described hereinbefore is preferable with a view to speedy mounting and dismounting operations.

Figure 5:
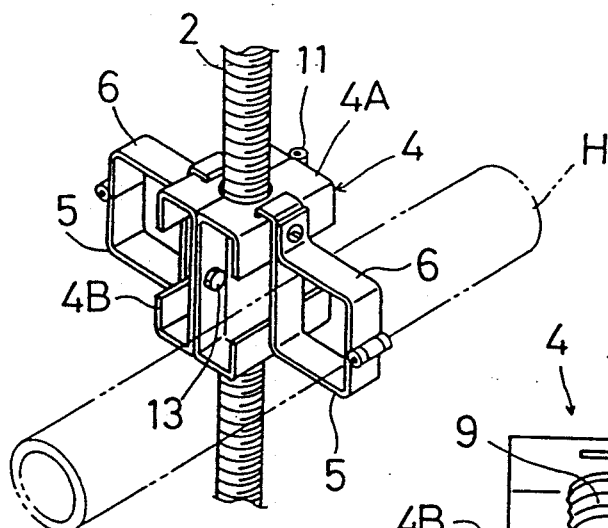
Figure 6:
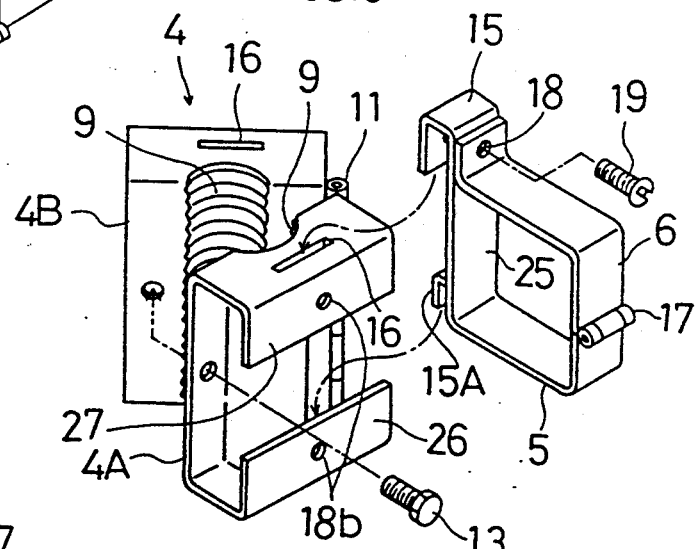
Figure 7:
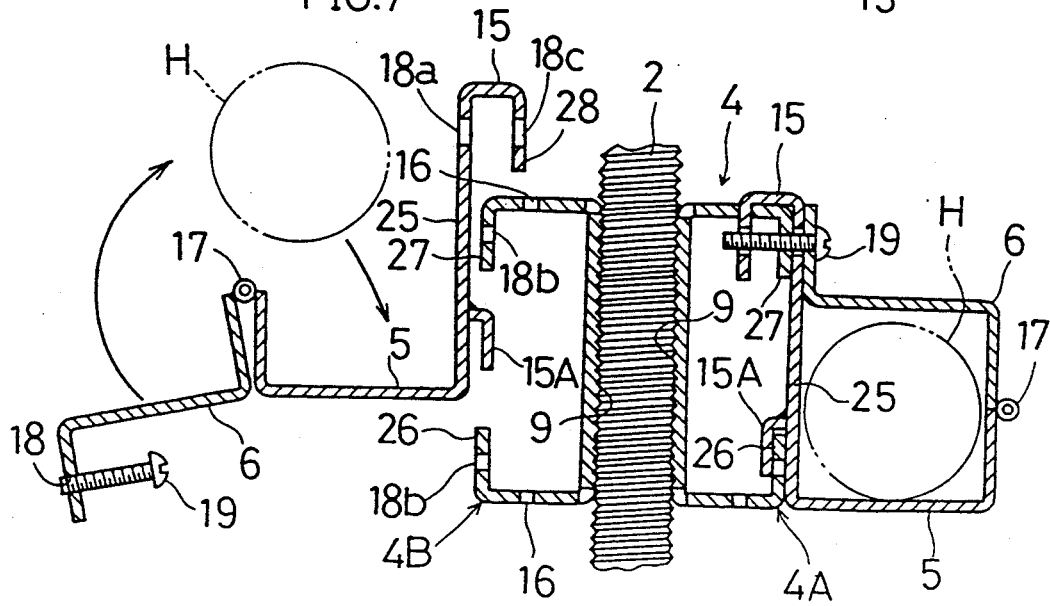

As shown in FIGS. 5 through 7, the nut 4 may comprise two pivotally interconnected split nut parts 4A and 4B in form of channel elements each including a downwardly bent upper end 27 and an upwardly bent lower end 26. In this case, for attaching each holder 5 to the nut parts 4A and 4B, each holder 5 has a side wall 25 extending above the free end of the cover 6 and bent downwardly to define a first hook 15, the side wall 25 including a second hook 15A extending downwardly from a lower position of the side wall 25 for engaging an edge of the upwardly bent lower end of the nut part 4A or 4B.

The upper end of each nut part 4A or 4B has an engaging slit 16 in a top surface thereof for receiving the first hook 15.

Further, as shown in FIG. 7, each cover 6 defines a threaded bore 18 in the free end thereof for engaging a small screw 19. This screw 19 extends also through a small bore 18a defined in the first hook 15, a threaded bore 18b defined in the downwardly extending upper end 27, and out through a small bore 18c in an end portion of the first hook 15. Thus, the holder 5 and cover 6 are reliably fixed to the nut 4, with the cover 6 retained in a closed position. The lower end 26 defines a slit 16 and a threaded bore 18b similar to those defined in the upper end 27. Thus, the nut 4 may be used as turned upside down.

The holder 5 and cover 6 are separable from the nut 4. Thus, as shown in FIG. 8, the holder 5 and cover 6 may be removed from the nut 4, and a different holder 30 may be used with a screw portion 31 thereof screwed into a threaded bore 29 defined in a bottom wall of the nut 4.

As shown in FIGS. 9(a) and (b), corners of the two split nut parts 4A and 4B remote from a pivotal connection 11 thereof may be chamfered to define guide surfaces 32 for the anchor bolt 2, with a spring 32 mounted at the pivotal connection 11 for urging the nut 4 to the closed position. This promotes operating efficiency since the nut 4 may be snapped onto the anchor bolt 2 with the guide surfaces 32 guiding the anchor bolt 2, the two split nut parts 4A and 4B being maintained closed under the spring load without using the small screw 13 and small nut 14.

As shown in FIG. 10, the nut 4 may comprise two split nut parts 4A and 4B including handle portions 21A and 21B, respectively, and a spring extending between the handle portions 21A and 21B. The split nut parts 4A and 4B are pivotable as the user grips or releases the handle portions 21A and 21B.

Figure 11:
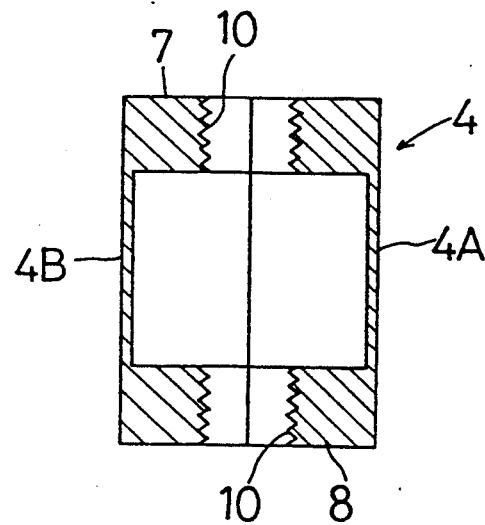
Figure 12:
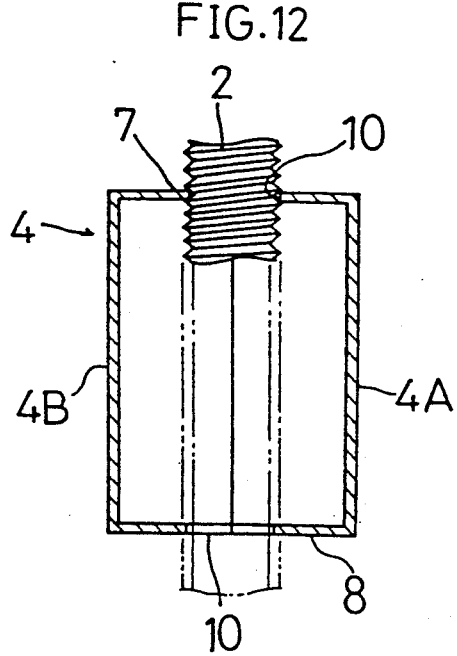
Figure 13:
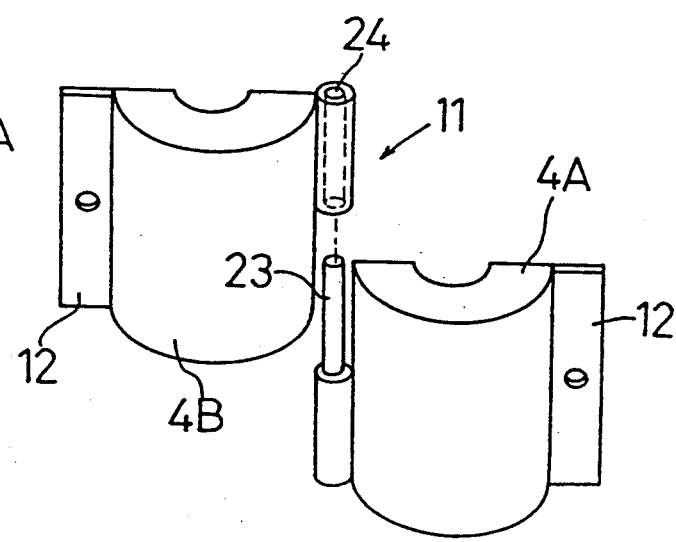
Figure 14:
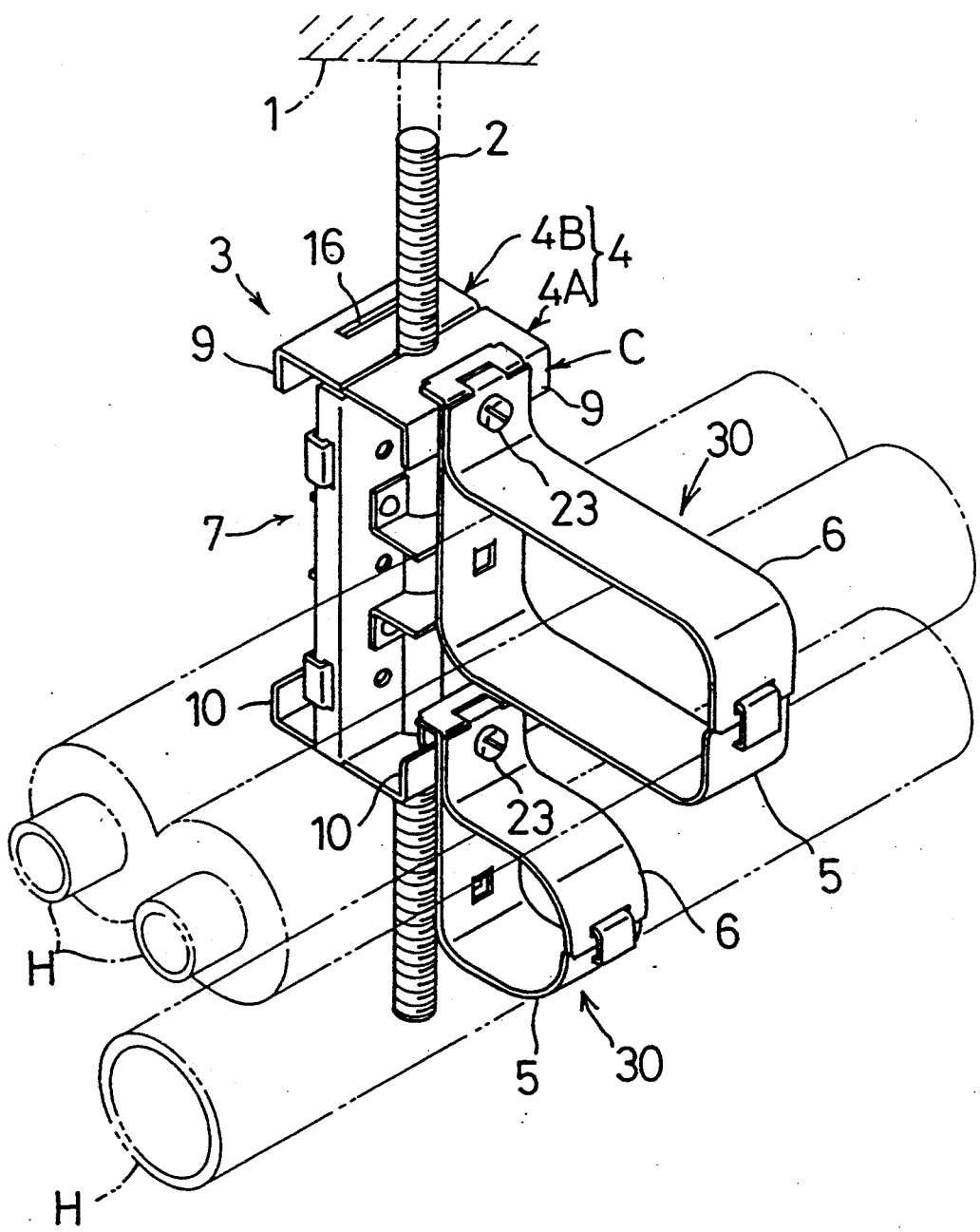
Figure 15:
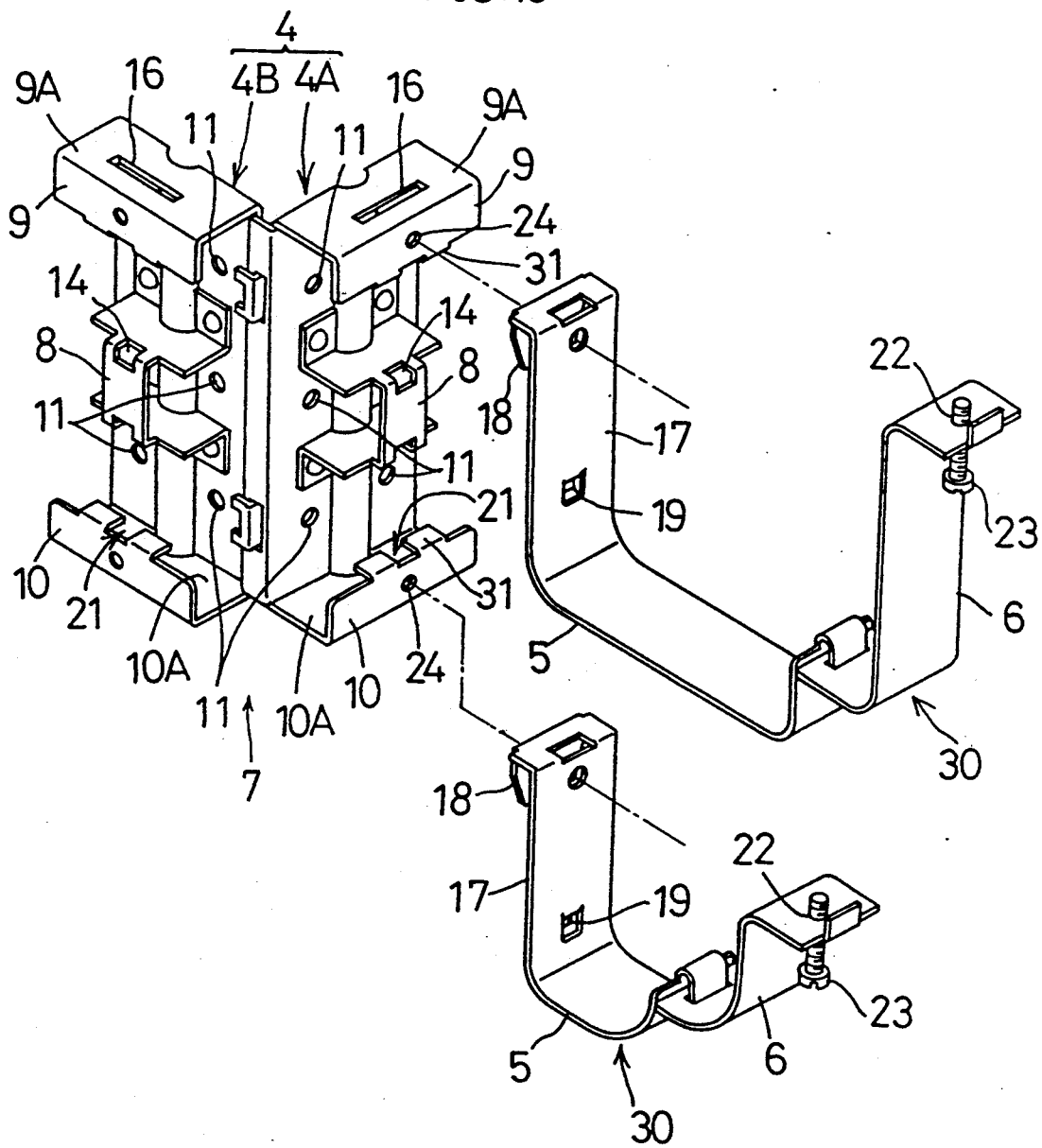

The nut 4 according to the present invention may have various shapes to suit specific applications or purposes. As shown in FIG. 11, for example, the nut 4 may include thick upper walls 7 and lower walls 8 defining female screws 10 on inside surfaces thereof. As shown in FIG. 12, the nut 4 may include thin upper walls 7 and lower walls 8 whose inside edges act as female screws 10. As shown in FIG. 13, the nut 4 may include a pivotal connection 11 having a pivotal axis 23 and a socket bore 24, the split nut parts 4A and 4B being separable by pulling the pivotal axis 23 out of the socket bore 24. The nut 4 may include only one female screw or more than two.

The rod-like supporting member 2 may comprise a plain bar instead of an anchor bolt. In this case, the nut 4 may comprise a friction sandwich type, or only one of the split nut parts may include female screw portions.

A second embodiment of the present invention will be described hereinafter with reference to FIGS. 14 through 18.

As shown in FIGS. 14 through 17, a metallic clamping device 7 comprises a nut 4 including two nut parts 4A and 4B formed of a sheet metal pivotally connected to each other. Each of the nut parts 4A and 4B includes a downwardly bent upper end 9, an upwardly bent lower end 10 and an intermediate projecting portion 8. The nut 4 includes a bolt clamping portion 41 defined by recesses formed in transversely intermediate positions of the respective nut parts 4A and 4B to correspond to a peripheral shape of an anchor bolt 2. These recesses include engaging grooves 40 in form of female screws. Each of the nut parts 4A and 4B defines first small bores 11 for receiving first small screws 12. The nut 4 is maintained in a closed position by connecting together the two nuts parts 4A and 4B with the first small screws 12 extending through the first small bores 11.

Each projection 8 has a fixed vertical dimension and is connected to the nut part 4A and 4B with the center of the projection 8 adjusted to a longitudinally midway position of the nut part 4A and 4B. Thus, each of the nut parts 4A and 4B of the clamping device 7 is vertically symmetrical.

For attaching the clamping device 7 to the anchor bolt 2, the nut parts 4A and 4B are opened and placed on a selected position of the anchor bolt 2. Then the nut parts 4A and 4B are closed while fitting the anchor bolt 2 and engaging grooves 40 into thread-to-thread engagement. Thereafter the nut parts 4A and 4B are tightened with the first small screws 12 and small nuts 15 to maintain the nut 4 in the closed position.

A first slit 16 is formed in each of a top wall 9A of the downwardly bent upper end 9 and a bottom wall 10A of the upwardly bent lower end 10. A second slit 14 is formed in each of upper and lower ends of the projection 8. These slits 16 and 14 are engagable with a metallic supporting device 30 (which includes the holder 5 and cover 6 described hereinbefore). The first slit 16 formed in the upper end 9 and the second slit 14 formed in the upper end of the projection 8 are used as a set for engaging the supporting device 30 at two positions.

The clamping device 7 may be used as mounted upside down. In this case, supporting device 30 engages the first slit 16 formed in the lower end 9 and the second slit 14 formed in the lower end of the projection 8.

The upper and lower ends 9 and 10, the projection 8, and the first and second slits 16 and 14 constitute an engaging device C.

Each of the holders 5 is formed by bending a band plate into a channel shape for receiving a pipe or pipes H. The pipe or pipes H snugly fitted into the channel is/are ready prevented from rolling out of the holder 5. Each holder 5 has one lateral wall 17 extending above the other lateral wall. The lateral wall 17 defines a downwardly extending first hook 18 at an upper end thereof, and a downwardly extending second hook 19 at a lower outside position thereof for engaging the projection 8. Each holder 5 is supported in a cantilever fashion by the clamping device 7, with the first hook 18 inserted into the first slit 16 formed in the downwardly bent upper end 9 and the second hook 19 inserted into the second slit 14 formed in the upper end of the projection 8.

Each cover 6 is pivotably connected to a distal end of each holder 5 through a hinge. The cover 6 is pivotably outwardly to open the holder 5 and inwardly to close the holder 5. The cover 6 has a free end defining a second small bore 22 for receiving a second small screw 23. The first small screw 23 is tightened to a first threaded bore 24 defined in downwardly bent upper end 9 to fix the cover 6 in a closed position.

For causing the pipe or pipes H to be supported by the supporting device 3, the second small screw 23 is removed from the second small bore 22 and threaded bore 24, and the cover 6 is swung outwardly to open the holder 5. Then the pipe or pipes H is/are placed in the holder 5 and the cover 6 is swung inwardly to close the holder 5. Finally, the second small screw 19 is inserted into the bores 22 and 24 and turned tight.

Figure 16:
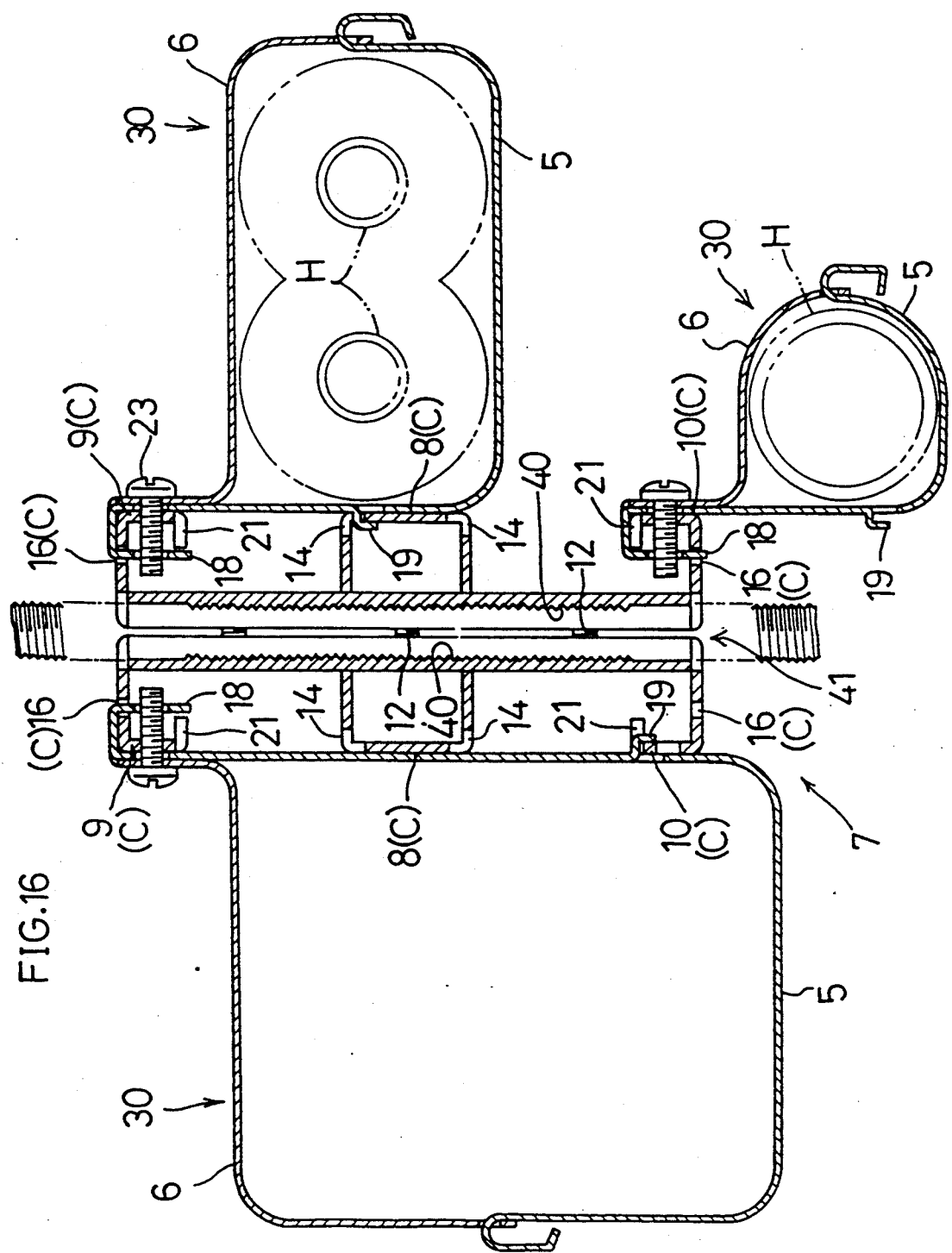
Figure 17:
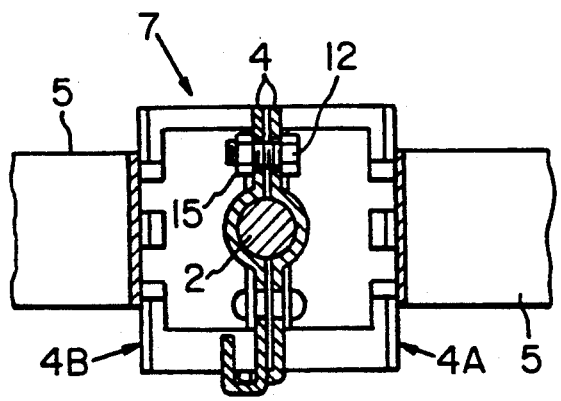

An additional supporting device 30 may be connected to a lower position of the clamping device 7. As shown in FIG. 16, the upwardly bent lower end 10 includes a claw 31 engageable with the first hook 18 of the holder 5. A second small screw 23 is inserted into the second small bore 22 formed in the free end of the cover 6, and the second small screw 23 is tightened to a first threaded bore 24 defined in the upwardly bent lower end 10. The downwardly bent upper end 9 also includes a claw 21 so that two supporting devices 30 may be connected to the clamping device 7 turned upside down.

A large supporting device 30 may be connected to the clamping device 7. That is, as shown in FIG. 16, the first hook 18 is inserted into the first slit 16 of the downwardly bent upper end 9, and the second hook 19 is engaged with a cutout 21 defined in an edge of the upwardly bent lower end 10.

Figure 18:
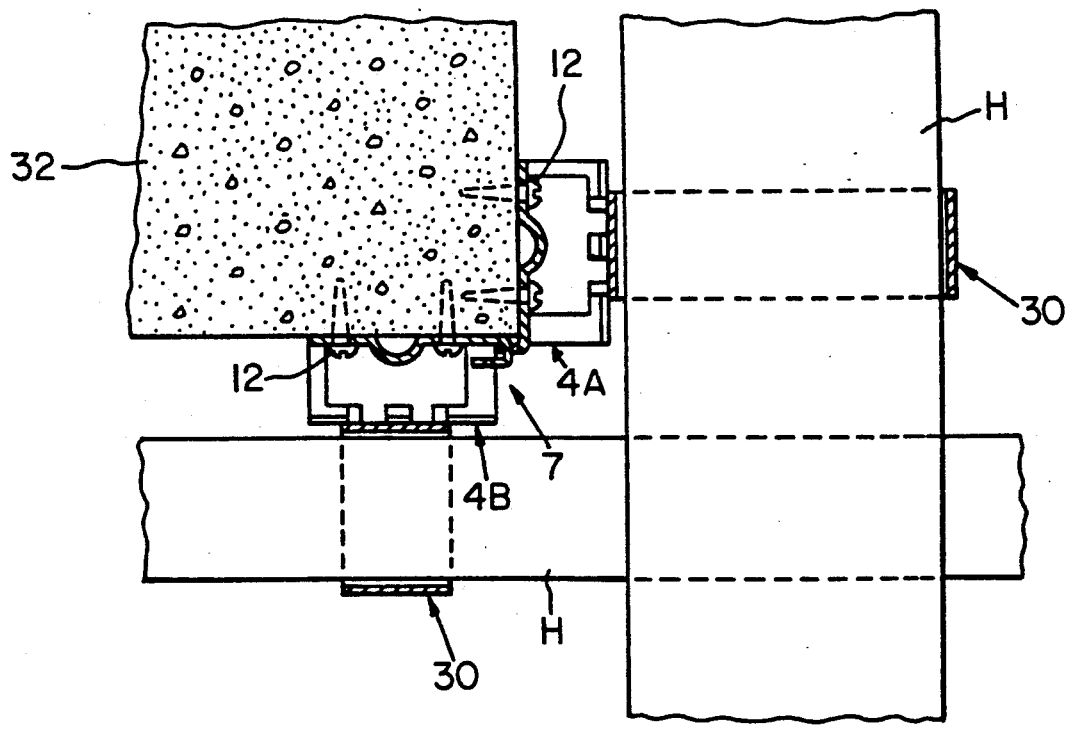

The clamping device 7 may be secured in an opened state to a wall of a building. As shown in FIG. 18, the clamping device 7 is placed so as to cover a corner portion of a building wall 32, and the first small screws 12 extending through the small bores 11 of the clamping device 7 are fixed to the wall 32. The supporting devices 30 are connected in a stepped relationship to each other to the respective nut parts 4A and 4B, whereby the pipes H are supported as crossing each other without mutual interference.

The first small bores 11 formed in the clamping device 7 constitute a mounting device. In this embodiment, the engaging device for engaging the rod-like supporting member is used also as the mounting device, but separate devices may be provided to perform the two functions, respectively. The clamping device 7 may be extended vertically to include a plurality of projections 8 for supporting three or more supporting devices 30. Then, a larger supporting device or devices 30 than those described above may be connected to the clamping device 7.

A third embodiment of the present invention will be described hereinafter with reference to FIGS. 19 through 22.

Figure 19:
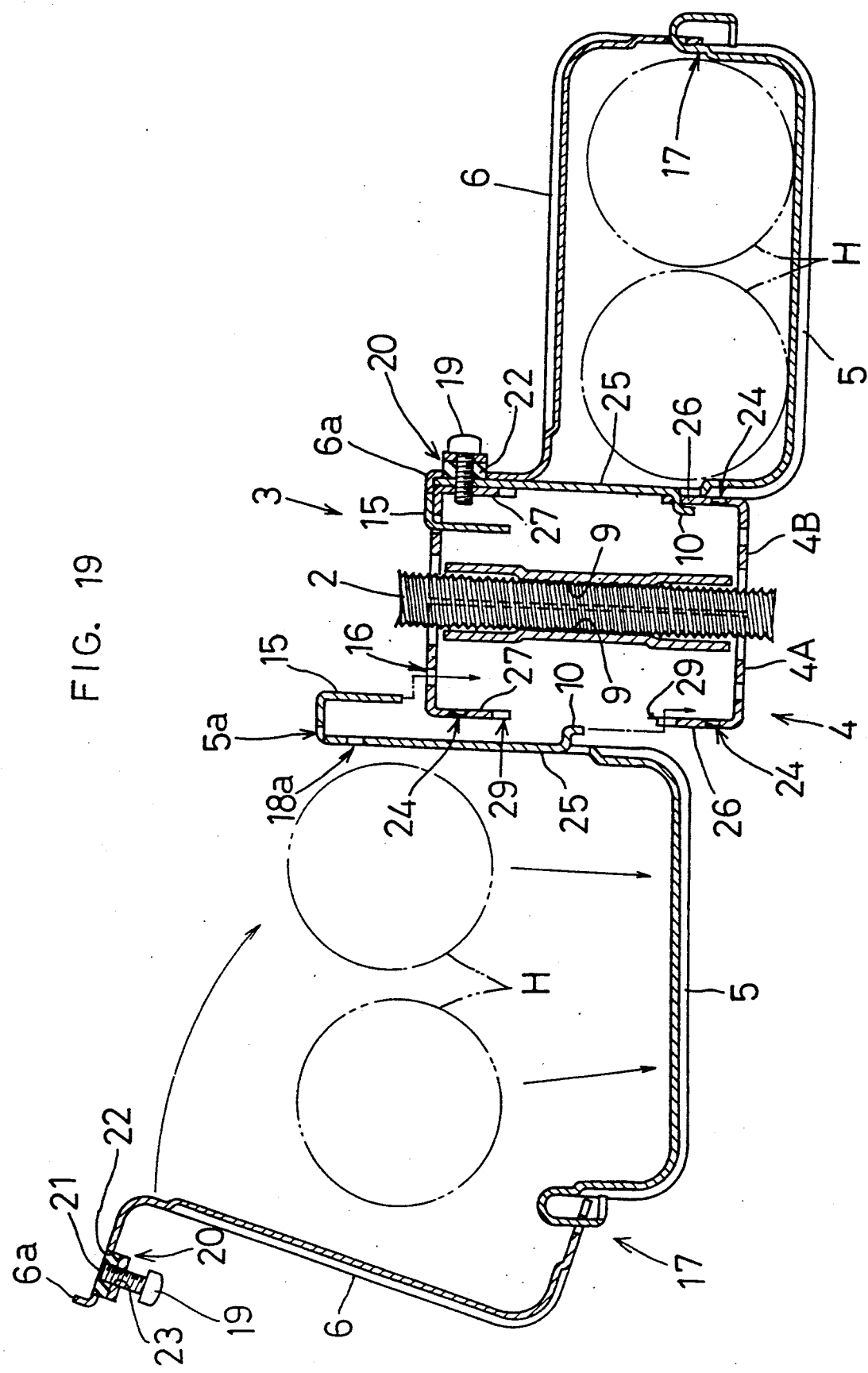
Figure 20:
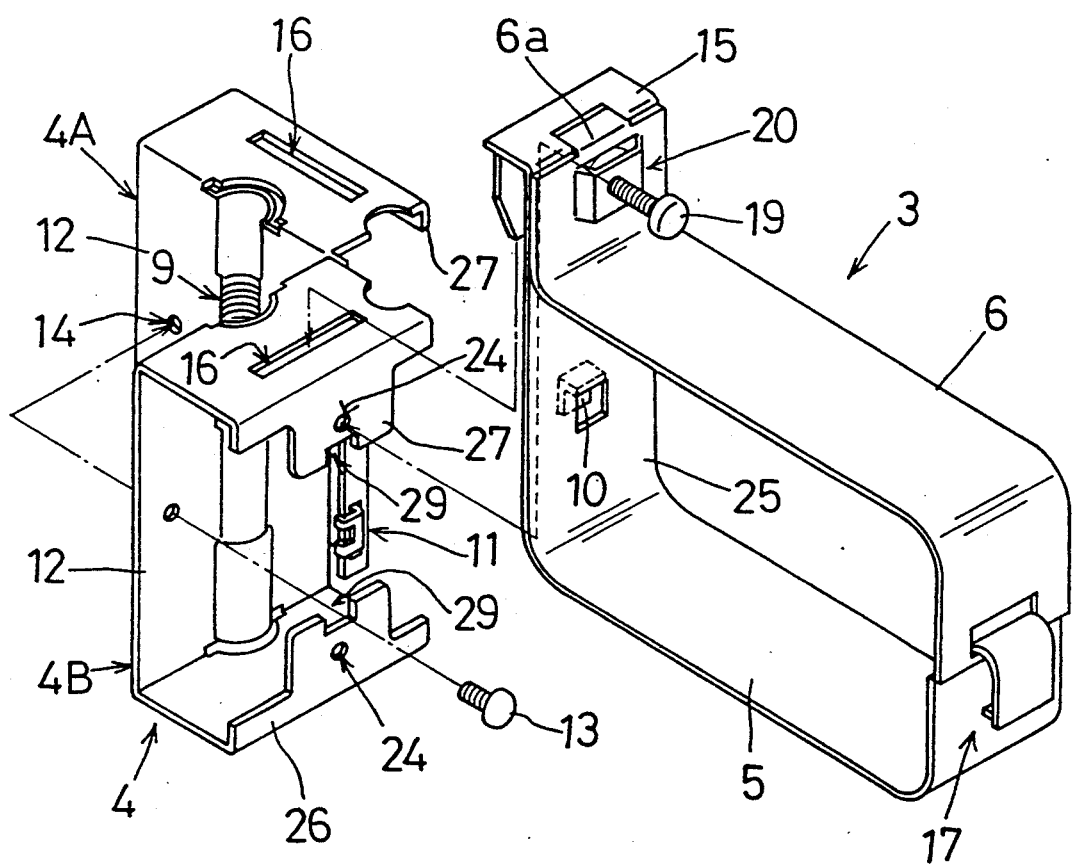
Figure 21:
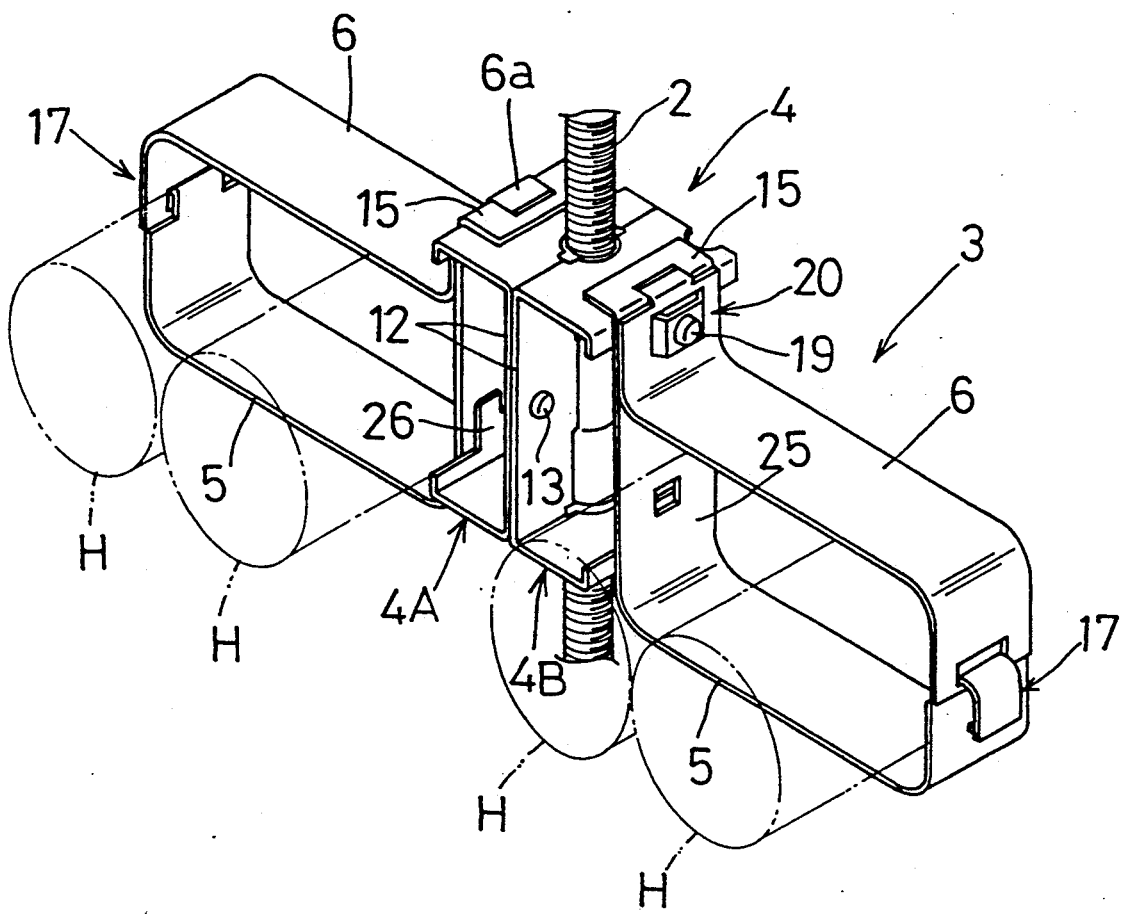

As shown in FIGS. 19 through 21, a nut 4 includes two nut parts 4A and 4B pivotally connected to each other. Each of the nut parts 4A and 4B includes a downwardly bent upper end 27, an upwardly bent lower end 26, and a screw portion 9 defined in an inside periphery of the nut part 4A or 4B for meshing with an anchor bolt 2. The nut parts 4A and 4B are swingable about a pivotal connection 11 between an open position and a closed position. Free ends 12 of the nut parts 4A and 4B remote from the pivotal connection 11 are joined together by a small screw 13 whereby the nut parts 4A and 4B are maintained in the closed position.

For attaching the nut 4 to the anchor bolt 2, the split nut parts 4A and 4B are opened and placed on a selected position of the anchor bolt 2. Then the nut parts 4A and 4B are closed to bring the respective free ends 12 together while fitting the anchor bolt 2 and screw portion 9 into thread-to-thread engagement. Thereafter the free ends 12 are tightened with the small screw 13 turned into threaded bores 14 to maintain the split nut parts 4A and 4B in the closed position.

Each holder 5 is formed of a sheet metal and bent into a channel shape for receiving pipes H. The pipes H snugly fitted into the channel are prevented from rolling out of the holder 5. The holder 5 includes a side wall 25 having an bent upper end adjacent a free end of a cover 6 to define a downwardly extending first hook 15. On the other hand, a first slit 16 is formed in a top wall of the downwardly bent upper end 27 for receiving the first hook 15. The side wall 25 includes a second hook 10 extending downwardly from a lower position of the side wall 25 for engaging a cutout 29 formed in an edge of the upwardly bent lower end 26.

Each cover 6 is also formed of a sheet metal and pivotably connected to a distal end of each holder 5 through a hinge 17. The cover 6 is pivotable outwardly to open the holder 5 and inwardly to close the holder 5. The cover 6 has a free end defining an engaging portion 6a, and the holder 5 defines a cutout 5a in an upper curved portion thereof for receiving the engaging portion 6a to position the cover 6 relative to the holder 6.

As shown in FIG. 19, a screw 19 is temporarily fixed to the free end of the cover, which may be turned relative to the free end. This temporary fixation will be described in detail. As also shown in FIG. 20, part of the cover 6 is cut and indented to define a recess 20 opposed to the side wall 25 of the holder 5. This recess 20 receives an elastic screw retainer 22 fitted tight therein, the screw retainer 22 defining a retaining bore 21 smaller than an outer diameter of the screw 19. The screw 19 is inserted through a loose bore 23 formed in a bottom of the recess 20 and engaged with the retaining bore 21.

Since the retaining bore 21 has an inside diameter smaller than the outer diameter of the screw 19, the retaining bore 21 of the elastic screw retainer 22 is expanded by elastic deformation when the screw is inserted into the retaining bore 21. The screw is thus rigidly held in the retaining bore 21 by virtue of the elastic restoring force of the retainer 22. This construction provides the screw 19 with a greater engaging length for the temporary fixation than where the screw 19 directly engages the cover 6. At the same time, the entire screw retainer 22 is expanded with the expansion by elastic deformation of the retaining bore 21, whereby the screw retainer 22 becomes tighter inside the recess 20 of the cover 6. Thus, the three functions noted above is effective to prevent the screw 19 from falling off the cover 6.

For closing the holder 5 with the cover 6 swung inwardly, the screw 19 is turned to extend through a small bore 18a formed in the first hook 15, through a threaded bore 24 formed in a side wall of the upper end 27 of the split nut part 4A or 4B, and out through a small bore 18a defined in an end portion of the first hook 15. Thus, the holder 5 and cover 6 are reliably fixed to the nut 4, with the cover 6 retained in the closed position. The upwardly extending lower end 26 defines a slit 16 and a threaded bore 24 similar to those defined in the upper end 27. Thus, the nut 4 may be used as turned upside down.

For causing the pipes H to be supported by the supporting device 3, the cover 6 is swung outwardly to open the holder 5 with the small screw 19 temporarily fixed. Then ends of the pipes H are placed in the holder 5 and the cover 6 is swung inwardly to close the holder. Finally, the small screw 19 is turned into engagement with the threaded bore 24.

Various modifications of the third embodiment will be set out below.

The screw retainer 22 preferably is formed of, but without being limited to, an elastic material. For example, a metal softer than the screw 19 may be used since the screw 19 screwed into the retaining bore 21 will then cut threads in the bore 21. Further, paper, fiber or the like may also be used. It will be sufficient if such a soft material is provided at least around the retaining bore 21.

The tight mounting of the screw retainer 22 in the recess 20 of the cover 6 in the above embodiment may be replaced by an engagement between a projection formed on the screw retainer 22 or in the recess 20 and a bore or the like opposed to the projection. Such an engagement may be used to hold the screw retainer 22 against rotation when the screw is turned.

Figure 22:
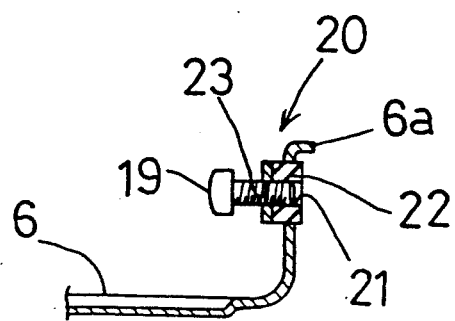
Figure 23:
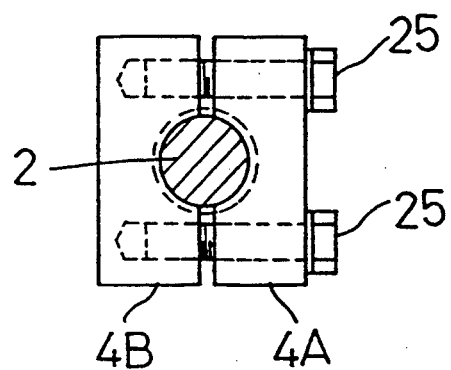
FIG. 23 is a plan view of a nut according to the prior art.
Figure 24:
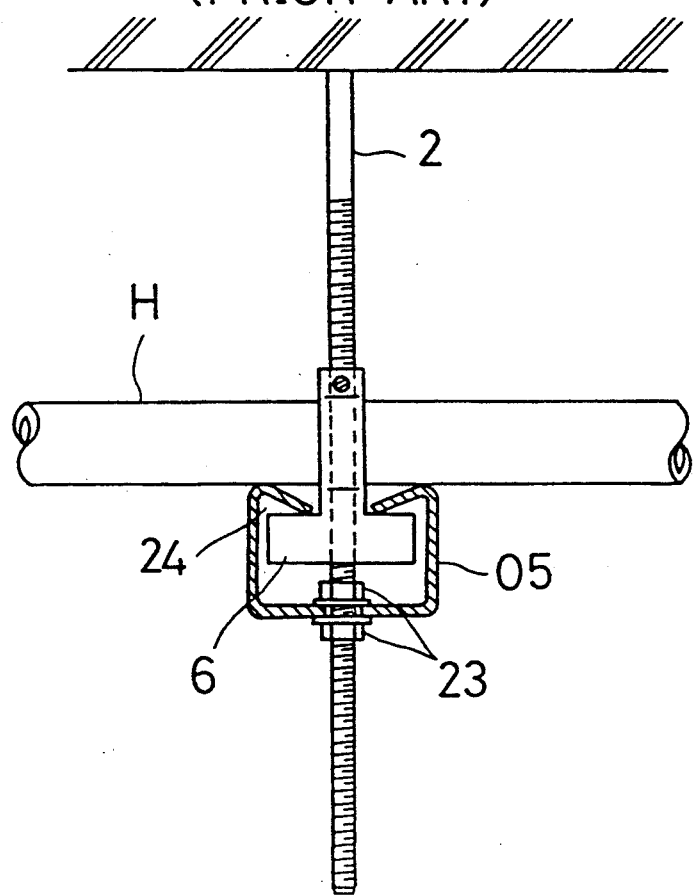
FIG. 24 is a side view of an elongate object supporting device according to the prior art.

FIG. 22 shows an example in which the screw retainer 22 is formed of an elastic material which has a thickness greater than a depth of the recess 20 of the cover 6. Thus, the screw retainer 22 mounted in the recess 20 projects from the surface of the cover 6. According to this construction, a projecting portion of the retainer 22 is squeezed between the side wall 25 of the holder 5 and the free end of the cover 6 when the screw 19 is tightened to the threaded bore 24. The projecting portion in such elastic deformation acts like a spring washer to retain the screw 19 in position.

In the above embodiment, the recess 20 is formed by cutting and indenting the cover 6. However, the recess 20 may be formed by other methods in practicing the invention. For example, the recess may be formed by perforating the cover 6 and welding or otherwise securing a bowl-like element to the perforated cover 6.

The temporary fixation of the screw according to the present invention is not limited in application to the pipe supporting device as described hereinbefore. Such temporary fixation may be used for various objects formed of sheet metal, e.g. for trough mounting devices in construction work and for metal fittings for supporting electric wires.

What is claimed is:

1. A supporting device of supporting elongate objects comprising:

a nut including a pair of nut parts formed by circumferentially dividing the nut, a pivotal connection for interconnecting circumferential ends of said nut parts to be pivotable between an open position and closed position, and retainer means for releasably holding said nut parts in the closed position;

holders each connected to said nut and formed into a recessed shape for receiving an elongated object; and covers for closing said holders, respectively, to prevent the elongated objects from moving out of said holders, wherein said holders are supported in a cantilever fashion by said nut, and each of said covers is connected to a free end of one of said holders to be pivotable between an open position and closed position, said supporting device further comprising fixing elements for fixing free ends of said covers in the closed position to said nut.

2. A supporting device as claimed in claim 1, wherein said fixing element is a screw said supporting device further comprising a screw retainer having a retaining bore of smaller diameter than an outer diameter of said screw, at least a portion of said screw retainer surrounding said retaining bore being formed of a material softer than said screw, and a recess formed in the free end of said cover for accommodating said screw retainer, said recess having a bottom defining a bore penetrable by said screw, and wherein said screw penetrating said bore is temporarily fixable and rotatable relative thereto by turning said screw into said retainer bore.

3. A supporting device as claimed in claim 2, wherein said screw retainer is formed of an elastic material.

4. A supporting device as claimed in claim 3, wherein said recess accommodates said screw retainer as compactly fitted therein.

5. A supporting device as claimed in claim 3, wherein said recess accommodates said screw retainer as held in position by engaging means.

6. A supporting device as claimed in claim 3, wherein said screw retainer has a thickness greater than a depth of said recess so that said screw retainer as mounted in said recess projects from surfaces of the free end of said cover surrounding said recess.

7. A supporting device as claimed in claim 1, wherein said holders and said covers are made of a rigid material.

8. A supporting device for supporting elongated objects of claim 1, wherein said nut parts form at respective side walls thereof connected portions to be connected with at least one of a holder or a cover capable of holding an elongated object, each of said nut parts having a side wall, said nut parts forming at respective side walls thereof connected portions, and at least one of said holder and said covers connected to said cover portions.

9. A supporting device for supporting elongate objects comprising:

a nut including a pair of nut parts formed by circumferentially dividing the nut, each of said nut parts having a side wall, a pivotal connection for interconnecting circumferential ends of said nut parts to be pivotable between an open position and closed position, and retainer means for releasably holding said nut parts in the closed position, wherein said retainer means in an urging element for resiliently urging said nut parts toward the closed position, said nut parts forming at respective side walls thereof connected portions;

holders each connected to said nut and formed into a recessed shape for receiving an elongated object;

covers for closing said holders, respectively, to prevent the elongate objects from moving out of said holders, at least one of said holders and said covers connected to said connected portions, wherein said holders are supported in a cantilever fashion by said nut, and each of said covers is connected to a free end of one of said holders to be pivotable between an open position and closed deposition; and elements for fixing free ends of said covers in the closed position to said nut.

10. A supporting device for supporting elongate objects comprising:

a clamping device for clamping elongated objects having a nut including a pair of nut parts formed by circumferentially dividing the nut, a pivotal connection for interconnecting circumferential ends of said nut parts to be pivotable between an open position and a closed position, and retainer means for releasably holding said nut parts in the closed position, engaging sections for connecting elongated object supporting devices to a plurality of positions vertically of each of said nut parts, and mounting section for attaching said nut parts in the open position to another object;

holders each connected to said nut and formed into a recessed shape of receiving an elongated object; and covers for closing said holders, respectively, to prevent the elongated objects from moving out of said holders, wherein said holders are supported in a cantilever fashion by said nut, and each of said covers is connected to a free end of one of said holders to be pivotable between an open position and closed position, said supporting device further comprising fixing elements for fixing free ends of said covers in the closed position to said nut.

11. A supporting device as claimed in claim 10, wherein said retainer means acts also as said mounting section.

12. A supporting device as claimed in claim 11, wherein said retainer means includes connecting elements for interconnecting circumferential ends of said nut parts remote from said pivotal connection.

13. A supporting device for supporting elongate objects comprising:

a clamping device for clamping elongate having a nut including a pair of nut parts formed by circumferentially dividing the nut, a pivotal connection for interconnecting circumferential ends of said nut parts to be pivotable between an open position and a closed position, and retainer means for releasably holding said nut parts in the closed position, an engaging section for connecting elongate object supporting devices to a plurality of positions longitudinally of each of said nut parts, and a mounting section for attaching said nut parts in the open position to another object;

holder each connected to said nut and formed into a recessed shape for receiving an elongate object; and covers for closing said holders, respectively, to prevent the elongate objects from moving out of said holders, wherein said holder are supported in a cantilever fashion by said nut, and each of said covers is connected to a free end of one of said holder to be pivotable between an open position and closed position, said supporting device further comprising fixing elements for fixing free ends of said covers in the closed position to said nut.

14. A supporting device as claimed in claim 13, wherein said fixing element is a screw, said supporting device further comprising a screw retainer having a retaining bore of smaller diameter than an outer diameter of said screw, at least a portion of said screw retainer surrounding said retaining bore being formed of a material softer than said screw, and a recess formed in the free end of said cover for accommodating said screw retainer, said recess having a bottom defining a bore penetrable by said screw, and wherein said screw penetrating said bore is temporarily fixable and rotatable relative thereto by turning said screw into said retaining bore.

15. A supporting device as claimed in claim 14, wherein said screw retainer is formed of an elastic material.

16. A supporting device as claimed in claim 15, wherein said recess accommodates said screw retainer as compactly fitted therein.

17. A supporting device as claimed in claim 15, wherein said recess accommodates said screw retainer as held in position by engaging means.

18. A supporting device as claimed in claim 15, wherein said screw retainer has a thickness greater than a depth of said recess so that said screw retainer as mounted in said recess projects from surfaces of the free end of said cover surrounding said recess.

19. A supporting device for supporting elongate objects of claim 13, wherein said clamping device is metallic.

* * * * *

UNITED STATES PATENT AND TRADEMARK OFFICE
CERTIFICATE OF CORRECTION

PATENT NO. : 5,199,675
DATED : April 6, 1993
INVENTOR(S) : Takeshi Deguchi

It is certified that error appears in the above-indentified patent and that said Letters Patent is hereby corrected as shown below:

On the title page, under item [19] and item [75], "DeGuchi" should read --Deguchi--.

Column 1 Line 23 "screwed" should read --secured--.

Column 1 Line 29 after "together" insert --at--.

Column 1 Line 48 "by the" should read --with--.

Column 2 Line 32 "cleaning" should read --closing--.

Column 2 Line 61 "section" should read --sections--.

Column 3 Line 5 after "other" insert --object--.

Column 3 Line 6 "device" should read --devices--.

Column 4 Line 17 after "side" insert --view--.

Column 4 Line 42 "side" should read --view--.

UNITED STATES PATENT AND TRADEMARK OFFICE
CERTIFICATE OF CORRECTION

PATENT NO. : 5,199,675

DATED : April 6, 1993

INVENTOR(S) : Takeshi Deguchi

It is certified that error appears in the above-identified patent and that said Letters Patent is hereby corrected as shown below:

Column 6 Line 37 after "18c" insert --defined--.

Column 6 Line 45 "4," should read --4.--.

Column 7 Line 21 after "metal" insert --and--.

Column 7 Line 33 "nuts" should read --nut--.

Column 7 Line 37 "and" should read --or--.

Column 7 Line 39 "and" should read --or--.

Column 8 Line 2 delete "ready".

Column 8 Line 15 "pivotably" should read --pivotable--.

Column 9 Line 29 "an" should read --a--.

Column 10 Line 3 "is" should read --are--.

UNITED STATES PATENT AND TRADEMARK OFFICE
CERTIFICATE OF CORRECTION

PATENT NO. : 5,199,675

DATED : April 6, 1993

INVENTOR(S) : Takeshi Deguchi

It is certified that error appears in the above-identified patent and that said Letters Patent is hereby corrected as shown below:

Claim 1 Line 67 Column 10 "of" should read --for--.

Claim 1 Line 4 Column 11 after "and" insert --a--.

Claim 1 Line 11 Column 11 "elongated" should read --elongate--.

Claim 2 Line 20 Column 11 after "screw" insert --,--.

Claim 8 Line 47 Column 11 "elongated" should read --elongate--.

Claim 8 Line 51 Column 11 "elongated" should read --elongate--.

Claim 9 Line 62 Column 11 before "closed" insert --a--.

Claim 9 Line 65 Column 11 "in" should read --is--.

Claim 9 Line 2 Column 12 "elongated" should read --elongate--.

Claim 9 Line 10 Column 12 "deposition" should read --position--

UNITED STATES PATENT AND TRADEMARK OFFICE
CERTIFICATE OF CORRECTION

PATENT NO. : 5,199,675

DATED : April 6, 1993

INVENTOR(S) : Takeshi Deguchi

It is certified that error appears in the above-identified patent and that said Letters Patent is hereby corrected as shown below:

Claim 10 Line 15 Column 12 "elongated" should read --elongate--.

Claim 10 Lines 23-24 Column 12 "elongated" should read --elongate--.

Claim 10 Line 25 Column 12 before "mounting" insert --a--.

Claim 10 Line 28 Column 12 "of" should read --for--.

Claim 10 Line 28 Column 12 "elongated" should read --elongate--.

Claim 10 Line 31 Column 12 "elongated" should read --elongate--.

Claim 13 Line 48 Column 12 after "elongate" insert --objects--.

Claim 13 Line 60 Column 12 "holder" should read --holders--.

Claim 13 Line 65 Column 12 "holder" should read --holders--.

Claim 13 Line 68 Column 12 "holder" should read --holders--.

Signed and Sealed this

Fourth Day of January, 1994

Attest:

BRUCE LEHMAN

*Attesting Officer*   *Commissioner of Patents and Trademarks*